July 16, 1957  J. R. GATES ET AL  2,799,770
WELDING APPARATUS

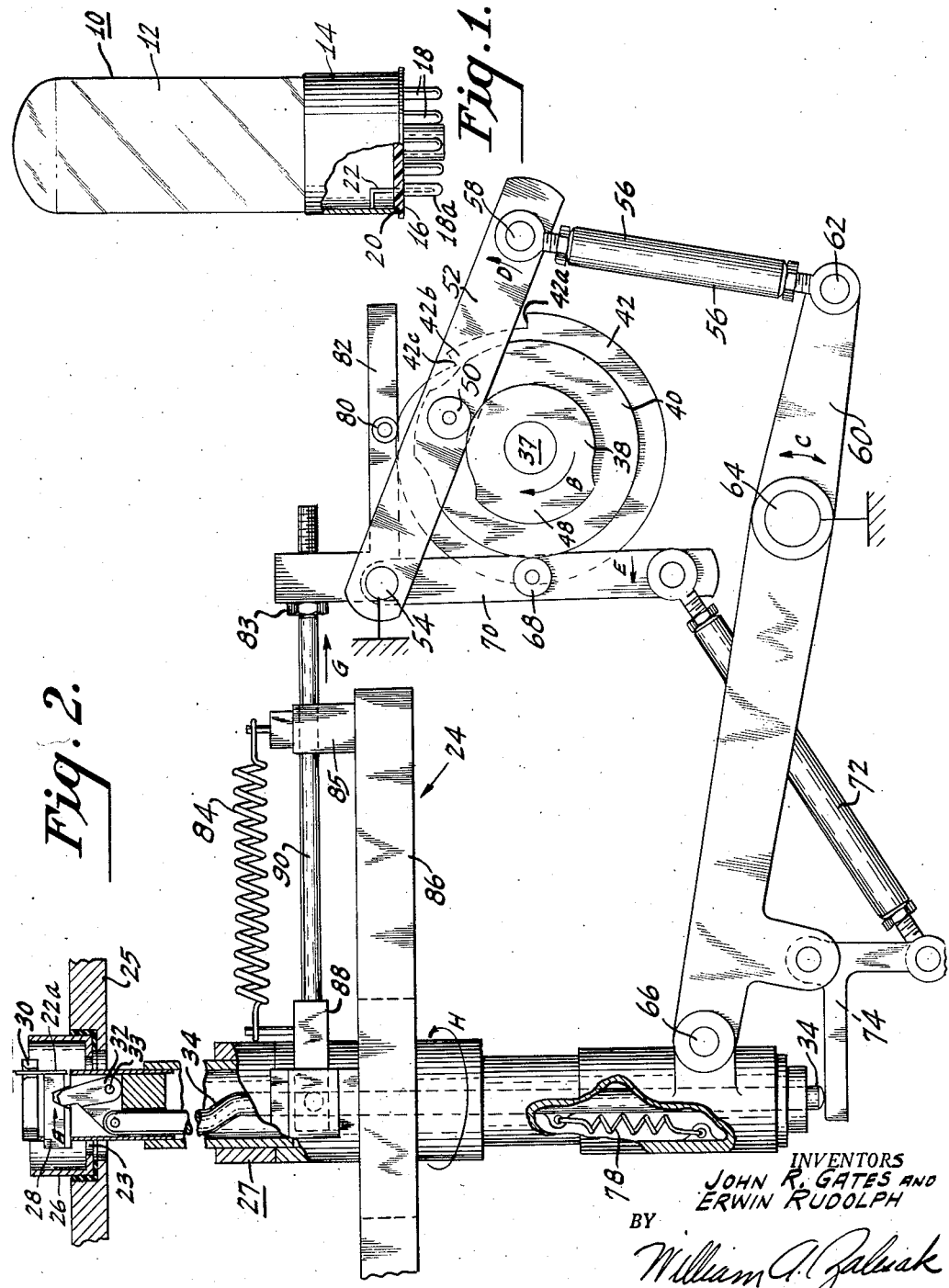

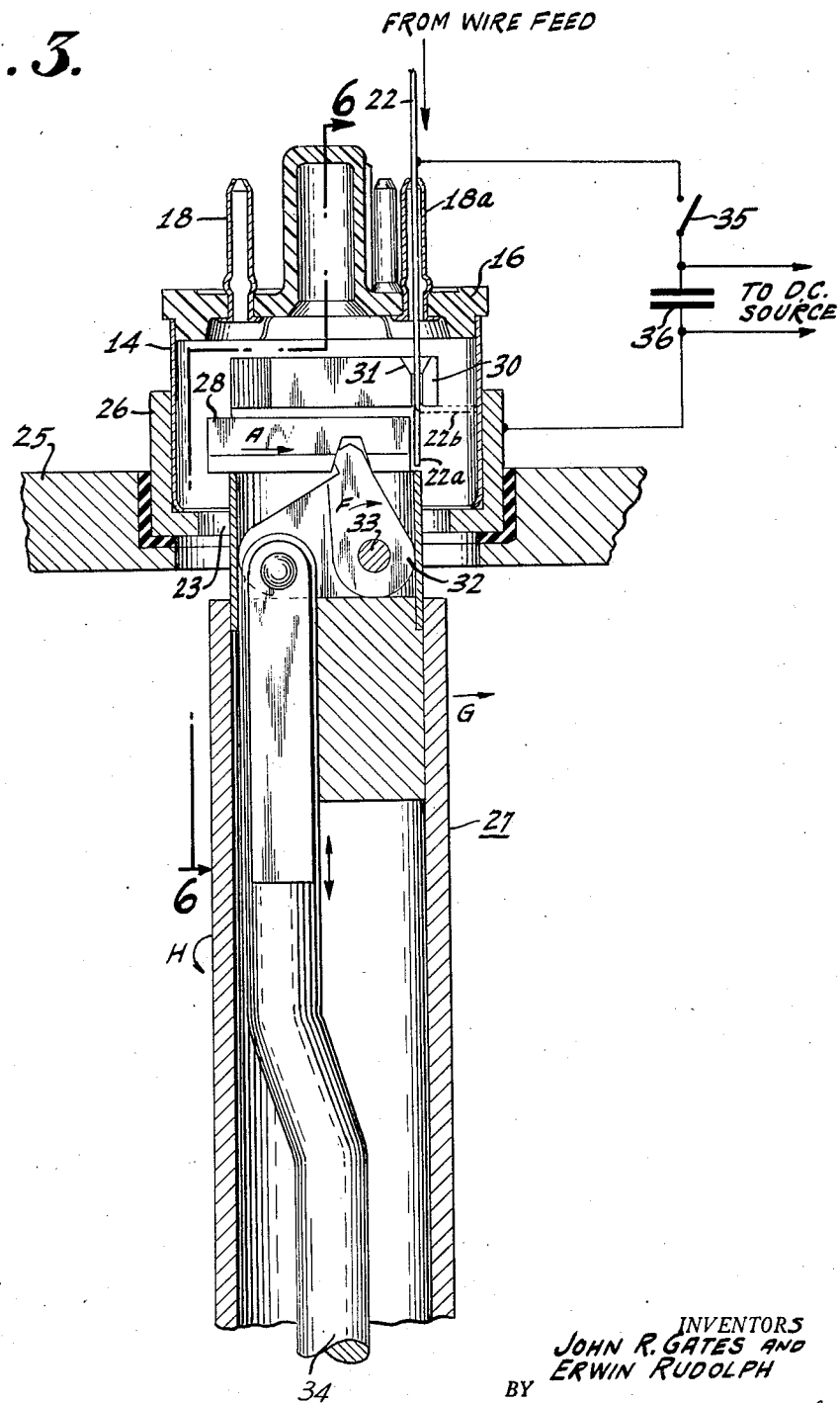

Filed June 1, 1955  4 Sheets-Sheet 3

INVENTORS
JOHN R. GATES AND
ERWIN RUDOLPH
BY William A. Zalesak
ATTORNEY

July 16, 1957    J. R. GATES ET AL    2,799,770
WELDING APPARATUS
Filed June 1, 1955    4 Sheets-Sheet 4
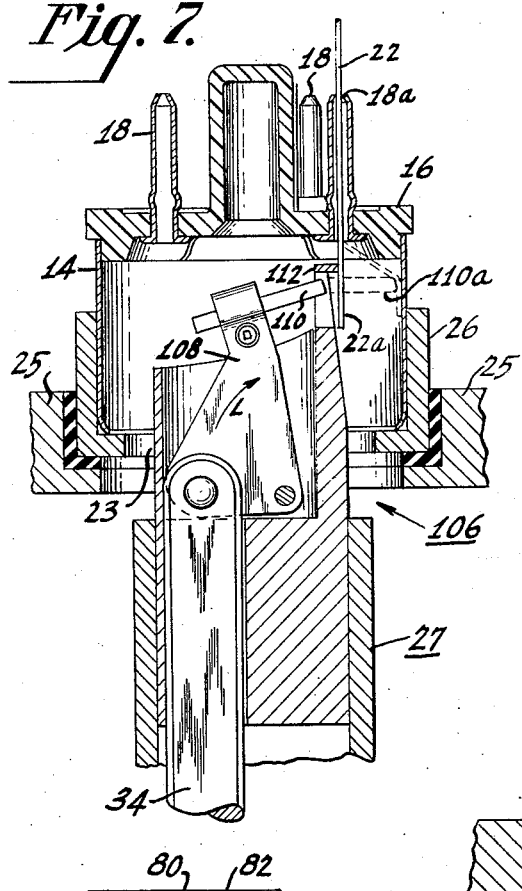
Fig. 7.
Fig. 8.
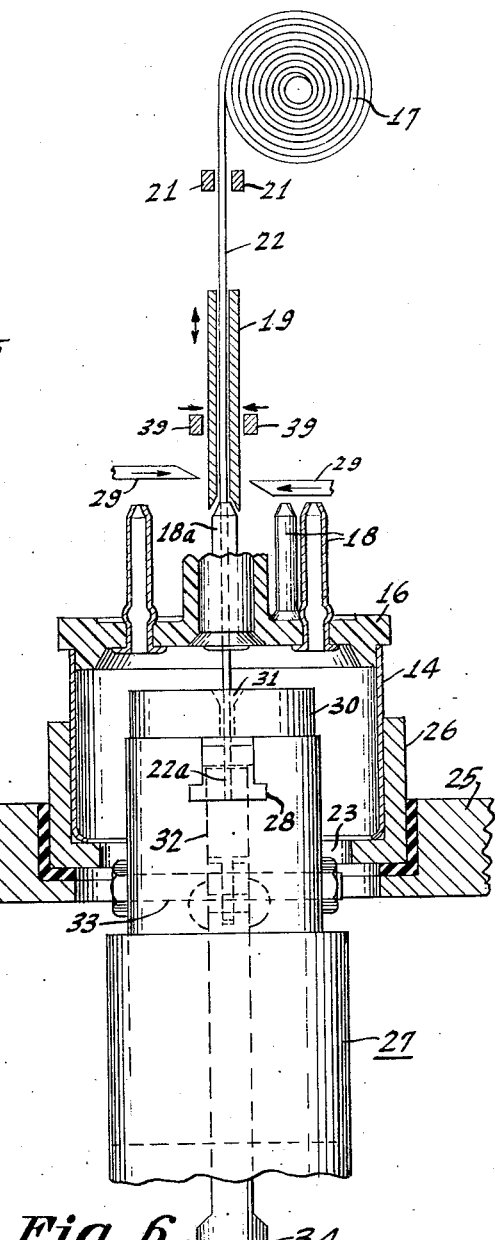
Fig. 6.
INVENTORS
JOHN R. GATES AND
ERWIN RUDOLPH
BY
William A. Balesak
ATTORNEY United States Patent Office 2,799,770
Patented July 16, 1957

2,799,770

WELDING APPARATUS

John Robert Gates, Hopatcong, and Erwin Rudolph, Chatham, N. J., assignors to Radio Corporation of America, a corporation of Delaware Application June 1, 1955, Serial No. 512,503

11 Claims. (Cl. 219—78)

This invention relates to apparatus for welding an object to a relatively inaccessible surface such, for example, as the inner surface of a small cylinder and, though not limited thereto, is herein described as embodied in apparatus for welding a wire to the inner surface of a metal base for a vacuum tube for the purpose of grounding said base.

An object of the invention is to provide an improved welding machine of the general character described and one which shall lend itself readily to mass production methods, e. g. in conjunction with a turret feed.

Another and important object of the invention is to provide a welding machine which shall operate to bend the part to be welded into the desired ultimate shape, in situ, prior to the welding operation and which is adapted to effect either "percussion" or "spot" (i. e. resistance) welds.

The foregoing and related objects are achieved in accordance with the invention by welding apparatus comprising means for positioning a wire in spaced relation to the part to which it is to be welded, slidable bending means for engaging the wire and bending a projecting end thereof into welding relationship with respect to said part, and means for applying a welding current thereto, automatically in the described sequence.

The invention is described in greater detail in connection with the accompanying four sheets of drawings, wherein:

Figure 1 is an elevational view partially in section of an electron tube employing a wire-base weld made by apparatus of the invention;

Figure 2 is a side elevational view of welding apparatus embodying one aspect of the invention;

Figure 3 is an enlarged sectional view of a portion of the welding apparatus shown in Figure 2. An electron tube base is shown positioned on a support and in registry with a portion of the welding apparatus;

Figure 6 is a side view taken on line 6—6 of a portion of the apparatus shown in Figure 3 and indicates schematically means for feeding wire into the apparatus;

Figure 7 is a side view, in section, of a portion of welding apparatus employing another aspect of the invention; and Figure 8 is an elevational view showing one of the cams used in transmitting motion to the apparatus shown in Figure 7.

Figure 4:
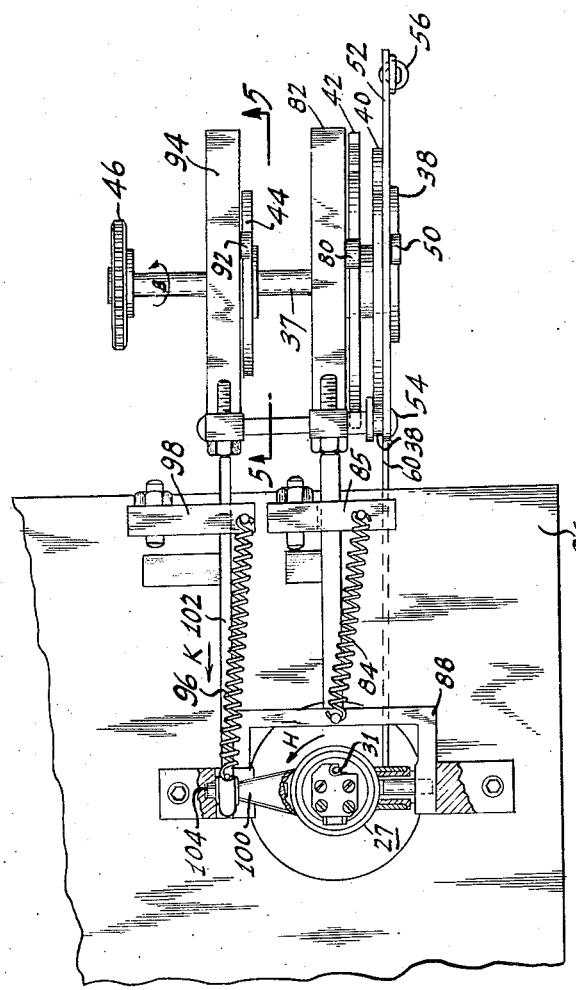
Figure 4 is a plan view, partially cut-away, of the welding apparatus shown in Figure 2.

Referring now to the drawings in greater detail there is shown in Figure 1 an electron tube 10 employing a weld made in accordance with the invention. The electron tube 10 includes a cylindrical envelope 12 and a base shell 14. The base shell 14 has a wafer 16 which in turn has a plurality of prongs 18 supported thereon. Some of the internal tube elements (not shown) may be connected by lead-in wires to these prongs. The wafer 16 may be secured to the end of the base shell 14 by crimped portions 20 thereof.

It is desirable to connect the inside surface of the shell 14 to a ground to establish a reference potential on the base. The shell is connected to the ground by means of a ground prong 18a which, in normal operation of the tube, is usually connected through a tube socket to the ground. The connection between the ground prong 18a and the base shell 14 may be made by a relatively short length of lead-in wire 22 which is fastened at one end thereof to the lower end of the prong 18a and fixed at the other end thereof, by a welding operation according to the invention, to the inside surface of the shell 14.

The apparatus of the invention may be used to make either "percussion" or "spot" welds, the particular metallic material of which the base shell is composed determining the particular welding technique used in bonding the lead-in wire to the inside surface of the shell. "Percussion" welding may be used to weld substantially any metallic material to another; this welding technique requires relatively exact spacing and timing in the welding technique. In percussion welding an arc is drawn between the parts to be bonded, the arc bringing the adjacent surfaces to their fusing temperatures whereupon the two surfaces are brought together with forging pressure thus extinguishing the arc and effecting a welded bond between the surfaces. "Spot" or "resistance" welding is often used where the metal of one of the two bodies to be welded offers substantial resistance to the passage of electric current allowing the point of contact between the bodies to be heated by the passage of the current flowing therebetween; this technique allows substantial latitude in the spacing of the bodies (the materials are merely held in contact against each other) and no alignment problems are presented. Examples of welds which may be effected with the percussion welding technique are copper, brass, or stainless steel base shell to a copper lead-in wire; the spot welding technique may satisfactorily effect a wire-shell weld, when copper lead-in wire is used, only with the use of shells of a metallic material having an appreciable resistivity such as, for example, that exhibited by stainless steel.

*Percussion welding apparatus*

Figures 2 and 3 show welding apparatus 24 embodying the invention and set up to weld the ground wire 22 of Figure 1 to the metal tube base shell 14 by the percussion welding method. To this end, the apparatus operates in conjunction with a conveyor, such as a rotatable turret (a portion of which is shown at numeral 25) and a wire feeding mechanism to present the work, i. e. the base shell 14 and a length of wire 22, to the welding apparatus. The rotatable turret 25 insulatingly supports, within an aperture 23 therein, an open ended base holder 26. The base holder is open at the top for receiving an electron tube base shell 14 (Figures 3 and 6) for support therein. The holder 26 is open at the bottom thereof to permit the passage thereinto of the upper or terminal portion of a welding shaft or head 27. As will hereinafter more fully appear, the welding head 27 is mounted for both axial and rotational movement with respect to the holder 26.

The terminal portion of the welding head 27 includes a wire bending mechanism having slidable bending means in the form of a plunger or slidable member 28 movable within and across the holder 26. A wire 22 is fed by a wire feeding mechanism and through the electron tube base ground prong 18a and into the base shell 14.

While any of the known wire feeding means may be used, one feeding means useful in practicing the invention is indicated schematically in Figure 6. A spool of wire 17 feeds the wire 22 downwardly and into the prong 18a. The wire may be passed through a guiding sleeve 19 (which reciprocates in a vertical direction) having a cupped lower end for centering a passage way in the sleeve, through which the wire 22 passes, into registry with the aperture in the ground prong 18a. Clamps or rollers 21 may be employed for feeding the wire into the prong. After the wire has been fed into the prong and the welding operation described below is performed, the sleeve 19 is retracted in an upward direction and cutting knives 29 are moved toward each other to sever the wire while clamping jaws 39 grip a portion of the wire on the side of the knives remote from the prong.

As shown in Figure 3, after the wire 22 is inserted through the ground prong 18a it is fed further through that prong and through a wire guide 30 having a hook-like member 31 (Figure 4) which guides the end of the wire into registry with the front end of the slidable member 28. The slidable member 28 is then moved forward in a direction indicated by the arrow A so as to engage the wire 22 and bend it through about 90° (as indicated at 22b) along the under surface of the wire guide 30 and into contact against the inside surface of the shell 14. The slidable member 28 is actuated by a bell crank 32, mounted for motion around a pivot pin 33, the actuation of the bell crank being controlled by axial motion of a welding head shaft 34. The wire feed mechanism feeds sufficient wire into the ground prong 18a so that the length of the portion of the wire which is bent about 90° by the slidable member is at least long enough to make contact against the inside shell surface. In actual practice the wire feed mechanism is preferably adjusted to feed a length of wire which is a few thousandths of an inch longer than is necessary for the bent portion of the wire to contact the shell. The extra few thousandths inch of the wire does not appreciably affect the contact of the wire against the shell but does insure that sufficient wire will have been fed by the wire feed mechanism into the welding apparatus.

The wire-end 22b is then backed off (in a manner described below) out of contact with the shell and a cam operated switch, represented by 35 in Figure 3, is closed causing a condenser 36, which was previously charged by a direct current source (not shown) to a predetermined energy level, to discharge and create an electric arc between the wire-end 22b and the base shell 14. As will be described below, at a predetermined point in the discharge cycle of the condenser 36, when the immediately adjacent portions of the wire-end and the base shell are at their fusing temperatures, the two are brought together with forging pressure, extinguishing the arc and effecting a welded bond between them.

*The driving mechanism*

The driving mechanism of the apparatus (Figures 2 and 4) includes a shaft 37 to which is fixed a plurality of cams 38, 40, 42, and 44 and a sprocket 46. The shaft 37 is adapted to be rotated, in a direction indicated by an arrow lettered B, by a motor and chain assembly (not shown) which engages the sprocket 46.

The driving mechanism is used to successively actuate four mechanisms: (i) a welding head raising mechanism; (ii) a wire bending mechanism; (iii) a welding head tilting mechanism; and (iv) a welding head twist mechanism. As will hereinafter more fully appear, (i) the first cam 38 actuates the mechanism for moving the welding head 27 in an axial direction up into the aperture 23 of the turret platform 25 and thus into a base shell 14 supported within the aperture; (ii) the second cam 40 actuates the mechanism for bending the wire 22 about 90° and toward the inside shell surface; (iii) the third cam 42 actuates the mechanism for tilting the welding head to first, bring the wire-end 22a into contact against the inside shell surface, second, backoff the wire-end 22a a predetermined distance from the shell, and third, press the wire-end against the shell with forging pressure, the aforementioned condenser discharge takes place immediately before and during the third or forging pressure pressing step; and (iv) the fourth cam 44 actuates the mechanism for imparting a rotational movement to the welding head 27 for twisting the welding head after the welding operation to free the welded work-piece from the hook-like portion 31 of the wire guide 30 so that the welding head can be lowered out of the turret aperture 23.

*Welding head raising mechanism*

Referring to Figure 2, when the shaft 37 brings the dwell portion of the first cam 38 into engagement with a first cam roller 50, a first arm 52 to which the cam roller 50 is fixed occupies the lowered position shown in the drawing and holds the welding head 27 in its raised position. The first arm 52 is fixed at one end thereof to a stationary pivot 54. The other end of the first arm is connected to a second arm 56 through a movable, second pivot 58. The second arm 56 is connected to one end of a lever 60 through a movable third pivot 62. The lever 60 is movable about a fourth pivot 64 in a direction indicated by arrow C. The other end of the lever 60 is connected to the welding head 27 by means of a fifth, movable pivot 66. When the shaft 37 rotates to a position bringing the rise 48 of the first cam 38 into engagement with the cam roller 50, the first arm 52 is raised in the direction indicated by letter D. The raising motion of the first arm 52 is transmitted through the second arm 56 and the lever 60 lowering the welding head 27.

*Wire bending mechanism*

When the shaft 37 brings the rise of the second cam 40 into engagement with a second cam roller 68, a third arm 70, which is fixed at one end thereof to the stationary, first pivot 54, is moved in a direction indicated by letter E. This motion is transmitted, by means of a fourth arm 72, to a second lever 74 raising the end of the lever in contact with the welding head shaft 34 disposed within the welding head 27. When the shaft 34 is raised, against the pull of a tension spring 78 which urges the shaft in a downward direction, the bell crank 32, to which the shaft is connected, pivots at the pivot pin 33 and is moved in a direction indicated by letter F (Figure 3). The motion of the bell crank 32 moves the slidable member 28 in the direction lettered A which bends the wire-end 22a toward the inside surface of the base shell 14 and into the position shown by the dotted lines 22b.

*Welding head tilting mechanism*

Referring now to Figures 2 and 4, when the wire-end 22a has been bent toward the base shell 14 a third cam roller 80 engages a first drop-off portion 42a of the third cam 42. This allows the portion of a third lever 82 to which the third cam roller 80 is fixed to pivot on the first pivot 54 and move downwardly under the influence of a second tension spring 84. The second tension spring 84 is fixed at one end thereof to a block 85 mounted on an apertured second platform 86 and at the other end thereof to the center of a yoke 88 fixed to the welding head 27. The yoke has extending therefrom a rod 90 which urges the third lever 82 (through an adjustment bolt 83) in a direction holding the third cam roller 80 against the cam 42. The first drop-off portion 42a allows the yoke rod 90 to move in the direction lettered G thus moving the welding head 27, to which the yoke 88 is fixed, in the same direction. This motion G of the welding head 27 causes the hoop-like member 31 of the wire guide 30 (Figure 3) to move toward the inside surface of the base shell 14 and thus insures that the wire-end 22a contacts the shell. As the cam 42 continues to rotate (Figure 2) a rise portion 42b is brought into registry with the third cam roller 80 causing the third lever 82 to be raised a few thousandths of an inch. The raising of the third lever 82, in turn, causes the welding head 27 and thus the wire guide 30 (Figure 3) to back away from the shell. This motion of the wire guide 30 backs off the wire-end 22a a few thousandths of an inch from the shell 14. After the wire-end 22a has been backed off from the shell 14 a cam (not shown) closes a switch, indicated by the numeral 35 in Figure 3, which causes the condenser 36, which was previously charged by a direct current source (not shown) to a predetermined energy level, to discharge creating an electric arc between the wire-end 22a and the shell 14. At a point in the discharge cycle of the condenesr 36 when the immediately adjacent portions of the wire-end and the shell are at their fusing temperatures, the cam 42 reaches a position bringing its second drop-off portion 42c into engagement with the third cam roller 80 thus moving the wire-end 22a (by means of the motion of the wire guide 30) into contact with the shell 14 with forging pressure. The electric arc is extinguished and a welded bond is effected between the wire-end 22a and the shell 14. The size of the arc gap is controlled by the setting of the adjustable bolt 83.

Welding head twist mechanism

After the wire-end 22a (Figure 3) has been welded to the electron tube base shell 14 the welding head 27 is twisted, by means of a rotational motion lettered H, to move the wire slide 30 to one side of the wire 22 so that the welding head can be lowered out of the turret aperture 23 without contacting the wire 22.

Figure 5:
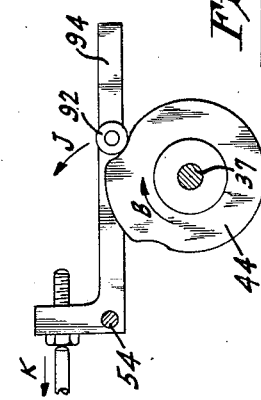
Figure 5 is side view taken on line 5—5 of a portion of the driving mechanism shown in Figure 4.

As shown in Figures 4 and 5, after the wire-end 22a has been welded to the electron tube base shell a rise portion of the fourth cam 44 engages a fourth roller 92 raising it. The raising of the fourth roller 92 moves a fourth lever 94, to which the roller is fixed, in the direction lettered J and against the influence of a third tension spring 96. The third tension spring 96 is fixed at one end thereof to a second block 98 mounted on the apertured second platform 86 and at the other end thereof to a spindle 100 connected to one side of the welding head 27. The spindle 100 has extending therefrom a spindle rod 102 which is connected to the fourth lever 94. When the fourth lever 94 moves in the direction J the spindle rod 102 moves in the direction K which in turn twists the welding head 27 in the direction H, the side of the welding head adjacent to the spindle 100 being mounted in a bearing 104 which allows the head to be twisted.

The welding head 27 (Figures 2 and 3) is then moved in a direction axial of the base shell 14 down and out from under the holder 26 and base shell 14 supported therein when the rise portion 48 of the first cam 38 engages the first cam roller 50. The wire 22 is then severed at a point thereof adjacent to the free end of the ground prong 18a by suitable cutting means (not shown). The first platform 25 may then be moved away and another base holder positioned above the welding head 27 and the welding apparatus 24 is ready to weld a lead-in wire to another electron tube base shell. It will be noted that the welding operation may be practiced on a base shell 14 without a wafer 16. The performance of a welding operation in the absence of a wafer enables an operator of the apparatus to observe the progress of the operation without the base prongs 18 in position. This simplifies initial as well as subsequent adjustments of the apparatus.

Spot welding apparatus

There is shown in Figures 7 and 8 a portion of welding apparatus 106 for spot welding an end of a lead-in wire 22 to an electron tube base shell 14. The apparatus and processing steps used in spot welding are similar to that used in the percussion welding apparatus 24 described with respect to Figures 2 through 6. In the spot welding apparatus 106 a bell crank in the form of an electrode holder 108 is substituted for the bell crank 32 shown in Figure 3; an electrode 110 is substituted for the slidable member 28; and a different shape of wire guide 112 is used instead of the one 30 shown in Figure 3. Also, since the step in percussion welding of bringing the wire-end 22a into contact with the shell 14 with forging pressure is not needed in spot welding, the third cam 42 having two drop-off portions is replaced with a cam 112 (Figure 8) having a single rise portion.

As shown in Figures 7 and 8, when the dwell portion of the cam 112 engages its cam roller 82, the rod 34 is raised moving the electrode holder 108 in direction L. The electrode 110 is thus moved to the position indicated by the dotted lines 110a bringing the wire-end 22a into contact with the inside surface of the shell 14. After the wire-end has contacted the shell a cam actuated switch (not shown) passes current between the wire-end and the shell welding the two together.

It is seen from the foregoing that an advantageous apparatus is provided for bonding a wire to a relatively inaccessible surface by either percussion or spot welding techniques.

What is claimed is:

1. Apparatus for joining an end of a wire to an inner surface of a cylinder, said apparatus comprising means adapted to position said wire in spaced relation to said surface, movable bending means adapted to engage said wire in said spaced relation and to bend the end thereof into contact with said surface, and electrical conducting means connected to said positioning means and adapted to connect said wire and surface across a source of welding potential, whereby said wire is welded to said surface.

2. A machine for making an electron tube base having a plurality of apertured prongs, said machine comprising means adapted to feed a wire through one of said prongs and to position an end of said wire in spaced relation to an inside surface of said base, bending means slideable to bend the end of said wire into engagement with said inside surface, and welding means for fusing said wire end to said inside surface, whereby said wire is connected to said inside surface of said base.

3. Apparatus for welding a wire to the inner surface of an open-ended hollow metal body, said apparatus comprising means for presenting said wire to the interior of said body in a non-welding position spaced from said inner surface, a shaft mounted to permit of axial movement, retractable means for entering a terminal portion of said shaft into said body through an open end thereof, a plunger supported on said terminal portion of said shaft for transverse movement into engagement with said wire, and means responsive to axial movement of said shaft for actuating said plunger to bring a portion of the wire that lies in its path into a position to be welded to said inner surface of said hollow metal body.

4. A machine for welding a wire to the inside surface of a metal cylinder having an open end, said machine comprising holding means for supporting said cylinder, means for moving said wire into said opening, a slide mechanism within said holding means and having a member slidable therein toward an inside surface of said cylinder and thus to bend said wire into engagement with said surface, and a potential source connectable between said wire and said cylinder, said potential source being adapted to provide an electrical charge sufficient to weld an end of said wire to said inside surface when said wire is in engagement with said surface.

5. A machine for welding a wire to a hollow electron tube base, said machine comprising a base holder for supporting said base, bending means slidable to bend an end of said wire into contact against an inside surface of said base, and a potential source connected between said base and said wire, said potential source being adapted to provide an electrical charge of a magnitude sufficient to weld said wire end to said surface when said wire end is in contact against said surface.

6. Apparatus for welding a wire to an inside surface of an electron tube base shell, comprising a support having an open end adapted to hold said shell therein, a slide mechanism within said support and having a member slidable within and across said support and adapted to bend a portion of said wire toward an inside surface and within a weldable distance therewith, a condenser connected between said shell and said wire and adapted to be powered by a power source, said condenser being of a capacity sufficient to weld a portion of said wire to said shell, whereby said apparatus is adapted to weld said wire to said inside surface of said shell.

7. A machine for joining a wire to an inside surface of a metal cylinder, and comprising means for supporting said cylinder, means for feeding said wire through said supporting means and parallel to said surface, a slide mechanism within said support and having a member slidable therewithin in a plane normal to a plane containing said wire, said slidable member being adapted to bend a portion of said wire through about 90° and into contact with said surface, and means for applying a potential source between said wire and said surface, said potential source being adapted to provide an electrical charge of a magnitude sufficient to weld said wire to said surface when a portion of said wire is in contact with said surface, whereby said wire end is joined to said surface at said contact.

8. Apparatus for welding a wire to an inside surface of an electron tube base shell, said apparatus comprising a cylindrical support having open ends, one of said ends being adapted to receive said shell therethrough, a slide mechanism extendable through the other of said ends, and into said support, said slide mechanism having a member slidable within and across said support and a hook-like wire guide member adapted to guide said wire into the path of travel of said slidable member, said slidable member being adapted to bend a portion of said wire through about 90° toward said inside surfaces of said shell and into contact therewith, whereby said wire is directed into a position for being welded to said shell.

9. A welding machine for fixing a lead-in wire to the inside surface of an electron tube base shell, said machine comprising a base support adapted to receive said shell and to receive and secure a wire therewithin, a wire holder adapted to secure said wire within said shell, a slidable forming block adapted to slidably bend a portion of a wire secured within said holder through about 90° and toward said inside surface of said shell, and means for passing an electric current between said wire and said shell for welding the two together.

10. A machine for making an electron tube base including a plurality of apertured prongs, said machine comprising wire feeding means for positioning a wire through one of said prongs and in spaced relation to an inside surface of said base, bending means slidable to bend a portion of said wire toward said inside surface in contact therewith, means for moving said wire portion and inside surface apart a predetermined distance, and a welding means for fusing said wire portion to said inside surface, said welding means including a condenser adapted to be alternately connected across a unidirectional charge source for charging said condenser and between said base and said wire for effecting an arc discharge therebetween when said wire portion has been moved away from said surface and to said predetermined position, whereby said wire is fused to said inside surface of said base.

11. Welding apparatus comprising an elongated cylindrical support having open ends, one of said ends being adapted to receive therethrough an electron tube base shell having apertured prongs, a slide mechanism within said support and extendable through the other of said ends, said slide mechanism having a member slidable within said support in a transverse direction thereacross, wire feed means adapted to feed a wire through said one of said ends and through an aperture in one of said prongs and into said shell, said slidable member being movable to bend a portion of said wire through about 90° and toward the inside surface of said shell and into contact therewith, said support being adapted to be connected to one side of a potential source which has the other side thereof connected to said wire, said potential source including a condenser adapted to be alternately connected across an unidirectional charge source for charging said condenser and between said shell and said wire for effecting a discharge therebetween thereby welding said wire to said shell, whereby said wire is welded to said inside surface of said shell.

References Cited in the file of this patent

UNITED STATES PATENTS 2,279,316    Herzog _____ Apr. 14, 1942